US009702684B2

(12) United States Patent
Kaneko et al.

(10) Patent No.: US 9,702,684 B2
(45) Date of Patent: Jul. 11, 2017

(54) ROTATION ANGLE DETECTION DEVICE

(71) Applicant: KEIHIN CORPORATION, Tokyo (JP)

(72) Inventors: Kiyoshi Kaneko, Utsunomiya (JP);
Michio Onuma, Shioya-gun (JP);
Ryuichi Yaegashi, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 0 days.

(21) Appl. No.: 14/303,796

(22) Filed: Jun. 13, 2014

(65) Prior Publication Data
US 2014/0368192 A1    Dec. 18, 2014

(30) Foreign Application Priority Data

Jun. 17, 2013    (JP) .................................. 2013-126952

(51) Int. Cl.
*G01B 7/30*    (2006.01)
*G01D 5/14*    (2006.01)

(52) U.S. Cl.
CPC .............. *G01B 7/30* (2013.01); *G01D 5/145* (2013.01)

(58) Field of Classification Search
CPC ........ G01R 33/07; G01R 35/00; G01R 33/88; G01R 33/072; G01L 3/10
USPC ........ 324/207.11–207.25, 200, 600, 167, 86, 324/624–633, 207.13, 207.14, 219–259, 324/160, 177, 179
See application file for complete search history.

(56) References Cited

U.S. PATENT DOCUMENTS

| 2007/0108968 A1* | 5/2007 | Ootawara | ............... F02D 9/105 |
| | | | 324/207.25 |
| 2015/0054499 A1* | 2/2015 | Musha | ................... G01D 5/245 |
| | | | 324/207.25 |

FOREIGN PATENT DOCUMENTS

| JP | H06273107 A | 9/1994 |
| JP | 2001266702 A | 9/2001 |
| JP | 2007259608 A | 10/2007 |
| JP | 2010286266 A | 12/2010 |

OTHER PUBLICATIONS

Notice of Reasons for Rejection corresponding to JP Application No. 2013-126952; Mailing date of Apr. 11, 2017.

* cited by examiner

*Primary Examiner* — Melissa Koval
*Assistant Examiner* — Trung Nguyen
(74) *Attorney, Agent, or Firm* — Cantor Colburn LLP

(57) ABSTRACT

Provided is a rotation angle detection device, having a magnet installed on a valve shaft, which magnetically detects a rotation angle of a valve shaft, the device being configured to include a plate member having a predetermined thickness which is fastened and fixed to one end of the valve shaft, wherein the magnet is molded to the plate member into a cylindrical shape having a height larger than the predetermined thickness.

6 Claims, 4 Drawing Sheets

ROTATION ANGLE DETECTION DEVICE

CROSS-REFERENCE TO RELATED APPLICATION

The present invention claims priority under 35 U.S.C. §119 to Japanese Patent Application No. 2013-126952, filed on Jun. 17, 2013, the content of which is incorporated herein by reference.

BACKGROUND

Field of the Invention

The present invention relates to a rotation angle detection device.

Description of Related Art

As a rotation angle detection device having a magnet installed onto a rotating shaft, which magnetically detects a rotation angle of the rotating shaft, a geared motor position detection device disclosed in, for example, Japanese Unexamined Patent Application, First Publication No. 2007-259608 is known.

The geared motor position detection device includes a sensor plate which is installed onto an output shaft. The sensor plate includes a bearing which is fitted to a D-shaped tip portion of the output shaft, and a sensor portion (a magnet forming pole magnetic fields of an N pole and an S pole) formed in a flange shape on an outer circumferential portion of the bearing (see FIG. 7 of Japanese Unexamined Patent Application, First Publication No. 2007-259608 below). The geared motor position detection device is configured to detect a rotation angle of the rotating shaft, based on a change in magnetic flux density detected by a magnetic sensor such as a Hall IC.

SUMMARY

However, there are the following problems in the aforementioned related art.

Since the sensor portion (magnet) of the related art is formed in a flange shape, an installation space may be required to be widened due to a projection of the sensor portion to the outside in a radial direction, and it may be difficult to install the sensor portion due to a constraint on structures around the axis of rotation. In addition, when the projection of the sensor portion to the outside in a radial direction is suppressed, a magnet volume is decreased, and it is difficult to secure a magnetic flux density for the sensing, which results in having to use a high-priced magnet having a large magnetic flux density per unit volume. Further, there is a problem in that the bearing has a complex shape in order to support the sensor portion, and material costs and processing costs are incurred thereon, which results in an increase in manufacturing costs.

An aspect of the present invention is contrived in view of the above problems, and an object thereof is to provide a rotation angle detection device which is capable of being reduced in size by a simple configuration, while securing a magnet volume, that is, a magnetic flux density.

In order to solve the above problem, an aspect of the present invention adopts the following configurations.

(1) According to one aspect of the present invention, there is provided a rotation angle detection device, having a magnet installed on a rotating shaft, which magnetically detects a rotation angle of the rotating shaft, the device including a plate member having a predetermined thickness which is fastened and fixed to one end of the rotating shaft, wherein the magnet is molded to the plate member into a cylindrical shape having a height larger than the predetermined thickness.

(2) In the aspect of the above (1), the plate member may include an outer edge portion which is buried in an inner circumferential surface of the magnet.

(3) In the aspect of the above (1) or (2), the magnet may include a first extending portion extending to one surface side of the plate member, and a second extending portion extending to the other surface side of the plate member.

(4) In the aspect of the above (3), the plate member may be fastened and fixed to the one end of the rotating shaft by a bolt inserted from the one surface side, and the first extending portion may extend to at least a head portion of the bolt protruding to the one surface side of the plate member.

(5) In the aspect of the above (3) or (4), the second extending portion may extend so as to be larger than the first extending portion.

(6) In any one of the aspects of the above (1) to (5), the plate member may be formed of a non-magnetic metal material.

In the aspect of the present invention, the magnet is molded into a cylindrical shape having a height larger than the thickness of the plate member, with respect to the plate member having a predetermined thickness which is fastened and fixed to one end of the rotating shaft. According to such a configuration, the plate member has a flat plate shape of a predetermined thickness and a simple configuration, and thus it is possible to keep material costs and processing costs low. In addition, according to such a configuration, the magnet is formed to have a large thickness in the thickness direction (an axial direction) of the plate member, and therefore it is possible to suppress the projection of the magnet to the outside in a radial direction while achieving an increase of a magnet volume.

In this manner, according to the aspect of the present invention, it is possible to obtain a rotation angle detection device which is capable of being reduced in size by a simple configuration, while securing a magnet volume, that is, a magnetic flux density.

DESCRIPTION OF THE EMBODIMENTS

Hereinafter, an embodiment of the present invention will be described with reference to the accompanying drawings.

Figure 1:
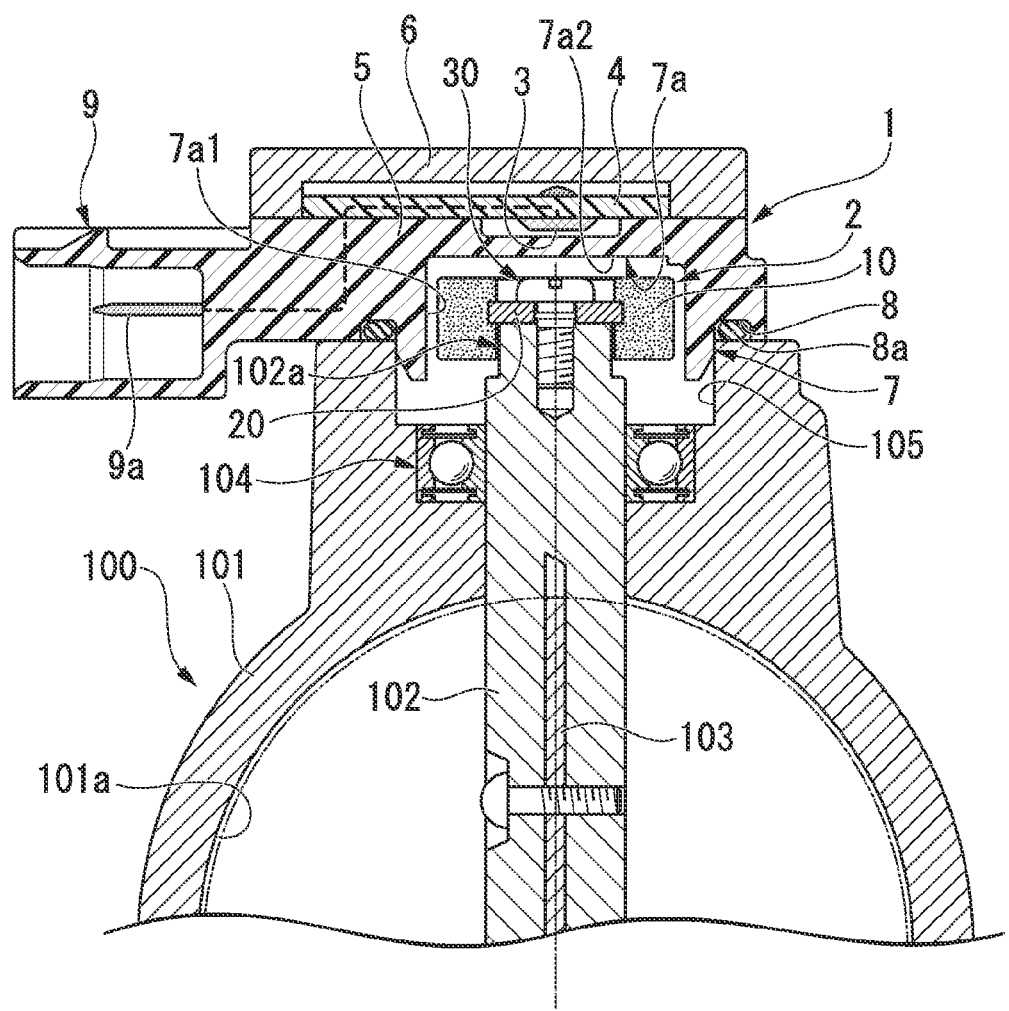
FIG. 1 is a cross-sectional view illustrating a configuration of a rotation angle detection device according to an embodiment of the present invention.

FIG. 1 is a cross-sectional view illustrating a configuration of a rotation angle detection device 1 according to an embodiment of the present invention.

As shown in FIG. 1, the rotation angle detection device 1 of the present embodiment is provided to a throttle valve 100. The throttle valve 100 is provided to an intake port of an engine which is not shown, and is used to adjust the intake amount of the engine.

The throttle valve 100 includes a throttle body 101 in which an intake passage 101a which communicates with the intake port of the engine is formed. A valve shaft 102 (rotating shaft) is rotatably supported in the throttle body 101 so as to traverse the intake passage 101a. A butterfly-type valve 103 that opens and closes the intake passage 101a is screwed into the valve shaft 102.

The valve shaft 102 is configured such that the circumferential surface thereof is rotatably supported by a bearing 104 on one end 102a side. In addition, the valve shaft 102 is configured such that the circumferential surface thereof is rotatably supported by a bearing (not shown) on the other end side (not shown).

The rotation angle detection device 1 is provided on the one end 102a side of the valve shaft 102. In addition, an electric motor which is not shown is connected to the other end side of the valve shaft 102.

The rotation angle detection device 1 is used to detect a rotation angle of the valve shaft 102 driven by an electric motor. The rotation angle detection device 1 includes a magnetizing body 2 having a magnet 10, installed onto the valve shaft 102, which rotates together therewith, and a magnetic sensor 3 that magnetically detects the rotation angle of the valve shaft 102 in cooperation with the magnet 10. The magnetizing body 2 is installed onto one end 102a of the valve shaft 102 so as to be relatively rotatable with respect to the magnetic sensor 3.

The magnetic sensor 3 has a magneto-electric conversion element, and is mounted onto a substrate 4. As the magneto-electric conversion element, it is possible to adopt a Hall element that detects a magnetic field of the magnet 10 using, for example, the Hall Effect. The substrate 4 is installed onto a sensor unit 5, and the outside thereof is covered with a cover 6. The throttle body 101 has a mounting hole 105 for mounting the sensor unit 5. The sensor unit 5 has a fitting portion 7 which is capable of being fitted to the mounting hole 105.

A bottomed cylindrical groove portion 7a is formed in the fitting portion 7. The groove portion 7a has a sidewall surface 7a1 facing the magnetizing body 2 in a radial direction and a top surface 7a2 (bottom) facing the magnetizing body 2 in an axial direction. In addition, in the sensor unit 5, a ring-shaped groove portion 8 is formed around the fitting portion 7. A seal ring 8a is disposed in the groove portion 8, and is configured to airtightly seal a gap between the sensor unit 5 and the throttle body 101.

In addition, the sensor unit 5 is provided with a connector 9. The connector 9 is provided with an electrode 9a for outputting a detection signal of the magnetic sensor 3 to an external control device which is not shown. The sensor unit 5 and the cover 6 as mentioned above are formed of an insulating synthetic resin material or the like.

Next, the installation structure of the magnet 10 will be described in detail with reference to FIGS. 2 to 4.

Figure 2:
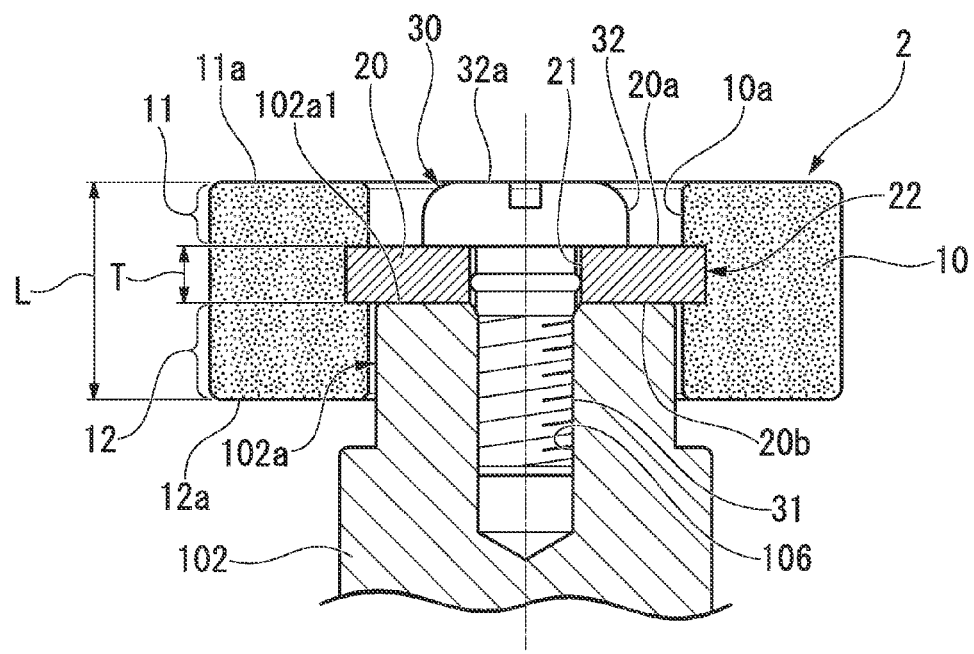
FIG. 2 is an enlarged view of essential parts illustrating an installation structure of a magnet according to the embodiment of the present invention.

FIG. 2 is an enlarged view of essential parts illustrating the installation structure of the magnet 10 according to the embodiment of the present invention.

Figure 3:
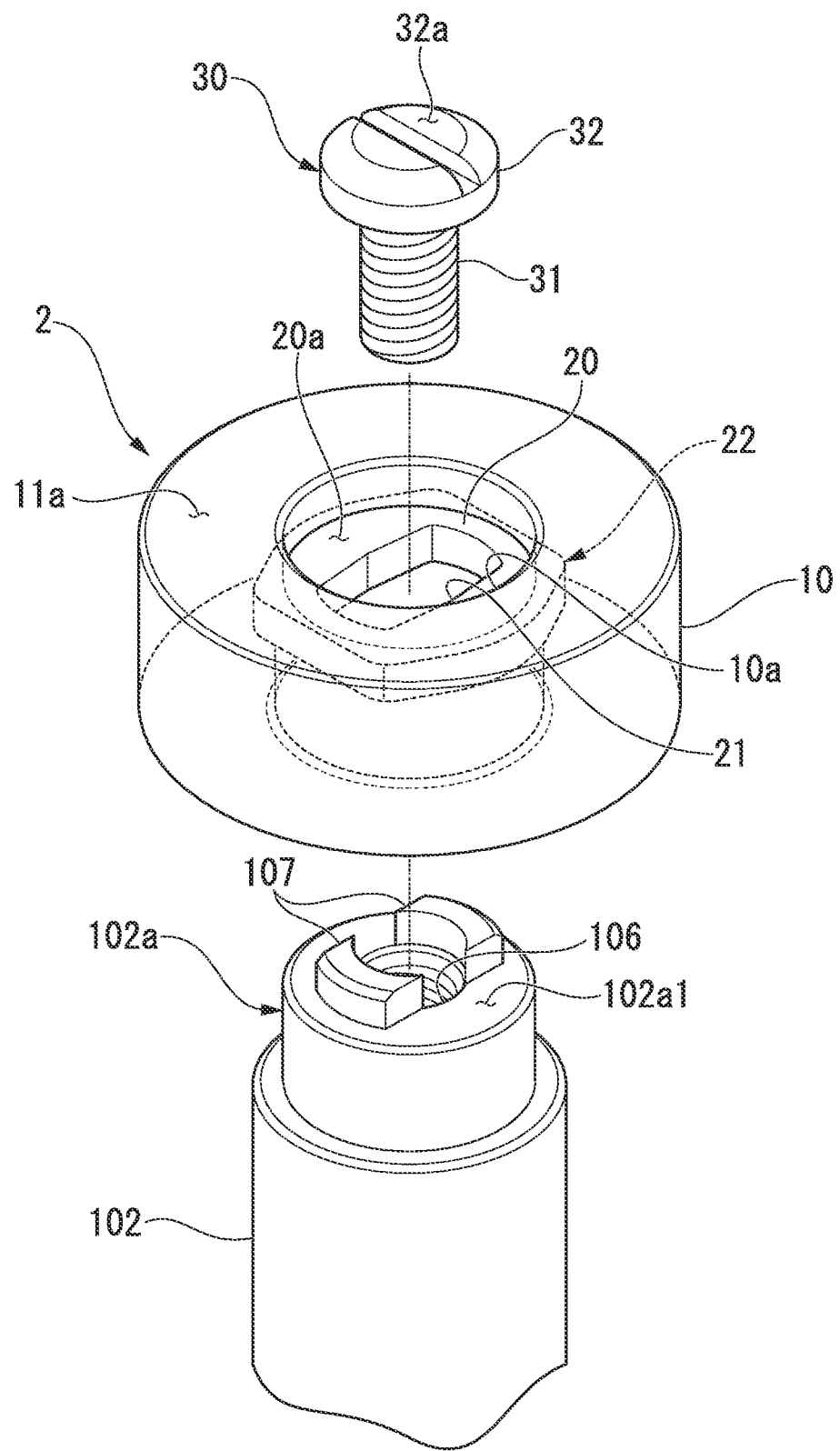
FIG. 3 is an exploded perspective view illustrating the installation structure of the magnet according to the embodiment of the present invention.
Figure 4:
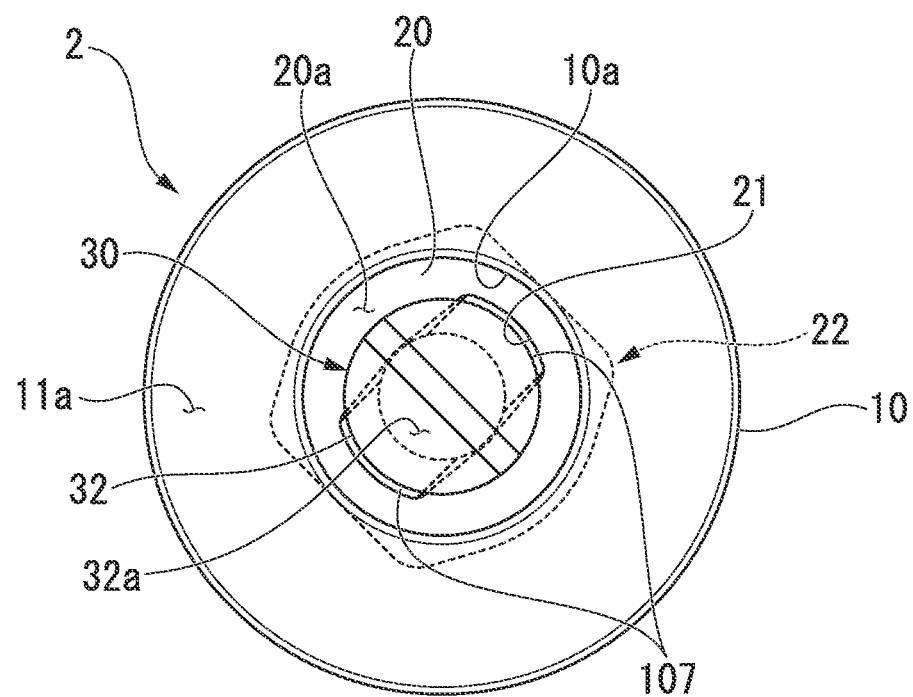
FIG. 4 is a plan view illustrating the installation structure of the magnet according to the embodiment of the present invention.

FIG. 3 is an exploded perspective view illustrating the installation structure of the magnet 10 according to the embodiment of the present invention. FIG. 4 is a plan view illustrating the installation structure of the magnet 10 according to the embodiment of the present invention.

As shown in FIG. 2, the magnetizing body 2 includes the magnet 10 and a plate member 20. The magnet 10 is installed onto the valve shaft 102 through the plate member 20.

The plate member 20 has a flat plate shape with a predetermined thickness, and is fastened and fixed to one end 102a of the valve shaft 102. The plate member 20 is fastened and fixed to one end 102a of the valve shaft 102 by a bolt 30 (fastening member) inserted from the one surface 20a side. The plate member 20 has an insertion hole 21 into which a shank 31 of the bolt 30 is inserted. As shown in FIGS. 3 and 4, the insertion hole 21 is formed in the center of the plate member 20.

The insertion hole 21 is formed to penetrate from one surface 20a to the other surface 20b, in the thickness direction of the plate member 20. The insertion hole 21 is formed in a long hole shape (a substantial rectangular shape) when seen in plan view. The width of the insertion hole 21 in a short-side direction becomes smaller than the diameter of a head 32 of the bolt 30, and the plate member 20 is configured to be capable of being fastened and fixed by the insertion of the bolt 30 with the plate member interposed between the head 32 and the valve shaft 102.

As shown in FIG. 3, a screw hole 106 into which the shank 31 of the bolt 30 can be threaded is formed in an end face 102a1 of one end 102a of the valve shaft 102. The screw hole 106 is formed in the axial direction of the valve shaft 102 vertically to the end face 102a1.

In addition, a protrusion pair 107 for whirl-stopping and positioning the magnetizing body 2 is formed on the end face 102a1 of one end 102a of the valve shaft 102.

The protrusion pair 107 is formed on the end face 102a1 so as to protrude in an axial direction from both sides with the screw hole 106 interposed therebetween. The protrusion pair 107 has an outward appearance according to the shape of the insertion hole 21 of the plate member 20. The protrusion pair 107 is configured to be disposed at an interval corresponding to the length of the insertion hole 21 in a long-side direction, and to perform rotation-stop and positioning of the magnetizing body 2 by engagement with the insertion hole 21 at both sides of the bolt 30 at the time of fastening and fixing the magnetizing body 2.

As shown in FIG. 2, the magnet 10 is molded to the plate member 20 into a cylindrical shape having the height larger than the thickness of the plate member. That is, the relationship of the thickness (thickness T) of the plate member 20 to the length (length L, the height) of the magnet 10 in a shaft center direction satisfies the relationship of length L>thickness T. The plate member 20 is formed of a non-magnetic metal material. The plate member 20 of the present embodiment is formed of, for example, SUS304. The magnet 10 is molded to the plate member 20 which is a non-magnetic metal material.

The magnet 10 is a permanent magnet made of a synthetic resin. The magnet 10 is configured such that magnetic powder obtained by pulverizing a sintered magnet such as, for example, a ferrite magnet is dispersed into a binding agent (binder) such as a thermoplastic resin of nylon or polyethylene, and the dispersed magnetic powder is molded in a cylindrical shape using a molding die in which the plate member 20 is set up, and then is magnetized. An N pole and an S pole are formed on the circumferential portion of the magnet 10 at a predetermined pitch by the magnetization.

As shown in FIG. 3, the magnet 10 is molded on an outer edge portion 22 of the plate member 20.

The outer edge portion 22 of the plate member 20 is buried in an inner circumferential surface 10a of the magnet

10. As shown in FIG. 4, a portion in which the magnet 10 and the plate member 20 overlap each other is formed when seen from the axial direction of the valve shaft 102. The outer edge portion 22 of the plate member 20 has a hexagonal shape when seen in plan view. The inner diameter of the magnet 10 is formed to be smaller than the inscribed circle of the outer edge portion 22 having a hexagonal shape.

As shown in FIG. 2, the magnet 10 includes a first extending portion 11 extending to the one surface 20*a* side of the plate member 20, and a second extending portion 12 extending to the other surface 20*b* side of the plate member 20. In this manner, the magnet 10 extends to both sides of the plate member 20 in a thickness direction. The first extending portion 11 extends to at least the head portion of the bolt 30 protruding to the one surface 20*a* side of the plate member 20. In other words, an upper end face 32*a* of the head 32 of the bolt 30 is configured to be disposed below an end face 11*a* of the first extending portion 11.

The second extending portion 12 extends so as to be larger than the first extending portion 11. That is, the length from the other surface 20*b* to an end face 12*a* of the second extending portion 12 is larger than the length from one surface 20*a* to the end face 11*a* of the first extending portion 11. The second extending portion 12 is configured to extend in the axial direction of the valve shaft 102 and to be disposed in a cylindrical shape at a predetermined interval with respect to the circumferential surface of one end 102*a*.

Subsequently, the operation (effect) of the rotation angle detection device 1 having the above configuration will be described.

When the valve shaft 102 is rotated by an electric motor which is not shown, the magnetizing body 2 installed onto the one end 102*a* of the valve shaft 102 is rotated. The magnetizing body 2 includes the magnet 10 having an N pole and an S pole formed on the circumferential portion thereof at a predetermined pitch. When the magnetizing body 2 is rotated together with the valve shaft 102, a magnetic flux density received by the magnetic sensor 3 disposed facing the circumferential portion (more specifically, end face 11*a*) of the magnet 10 changes. The magnetic sensor 3 outputs a detection signal according to the changing magnetic flux density through a magneto-electric conversion element. Such a detection signal is input to a control device, not shown, through the electrode 9*a* provided in the connector 9, and opening and closing control of the throttle valve 100 is performed.

In the present embodiment, as shown in FIG. 2, the magnet 10 is molded into a cylindrical shape having the height larger than the thickness of the plate member 20, with respect to the plate member 20 having a predetermined thickness which is fastened and fixed to the one end 102*a* of the valve shaft 102. According to such a configuration, the plate member 20 has a flat plate shape of a constant thickness and a simple configuration, and therefore it is possible to keep material costs and processing costs low. In addition, according to such a configuration, the magnet 10 is formed to have a large thickness in the thickness direction (the axial direction of the valve shaft 102) of the plate member 20 rather than the radial direction thereof, and thus it is possible to suppress the projection of the magnet 10 to the outside in a radial direction while increasing a magnet volume in an axial direction.

Therefore, as shown in FIG. 1, even when the magnet 10 is disposed in the groove portion 7*a* and a magnet volume cannot be increased to the outside in a radial direction due to the relationship of interference with the sidewall surface 7*a*1, it is possible to achieve an increase of the magnet volume in the axial direction. Therefore, it is possible to secure a magnetic flux density of the magnetic sensor 3 for the sensing while reducing the size in the radial direction.

Incidentally, the head 32 of the bolt 30 is present on the one surface 20*a* side of the plate member 20 (see FIG. 2). For this reason, the top surface 7*a*2 is heightened, and a space for disposing the head 32 of the bolt 30 is formed in the groove portion 7*a* (see FIG. 1). In the present embodiment, in order to effectively use this space, the first extending portion 11 of the magnet 10 is caused to extend to at least the upper end face 32*a* of the head 32 of the bolt 30 (see FIG. 2). Thereby, a magnet volume can be increased with the use of an effective space on the one surface 20*a* side of the plate member 20.

On the other hand, since a large installation space of the magnet 10 can be secured at the other surface 20*b* side of the plate member 20, the second extending portion 12 is caused to extend so as to be larger than the first extending portion 11. In this manner, the magnet 10 is caused to extend further to the other surface 20*b* side of the plate member 20, and thus a magnetic flux density of the magnetic sensor 3 for the sensing can be secured by making up for a shortfall in a magnet volume at the one surface 20*a* side having space limitation while achieving an increase of the magnet volume.

In addition, the cylindrical magnet 10 formed to have a large height in this manner is held by the outer edge portion 22 of the plate member 20 being buried in the inner circumferential surface 10*a* thereof. Thereby, the magnet 10 and the plate member 20 can be strongly connected to each other by a simple configuration. In addition, as shown in FIGS. 3 and 4, the outward appearance of the outer edge portion 22 is formed in a hexagonal shape, and the volume of the plate member 20 buried in the magnet 10 is suppressed, thereby allowing a magnet volume in a radial direction to be secured to that extent.

As stated above, according to the present embodiment, the rotation angle detection device 1, having the magnet 10 installed onto the valve shaft 102, which magnetically detects the rotation angle of the valve shaft 102 is obtained, the rotation angle detection device 1 being configured to include the plate member 20 having a predetermined thickness which is fastened and fixed to one end 102*a* of the valve shaft 102, and to be capable of being reduced in size by a simple configuration while securing a magnet volume, that is, a magnetic flux density, by adopting a configuration in which the magnet 10 is molded to the plate member 20 into a cylindrical shape having a height larger than the predetermined thickness.

As stated above, although the preferred embodiment of the present invention has been described with reference to the drawings, the present invention is not limited to the above-mentioned embodiment. The shapes, combination and the like of the respective components shown in the above-mentioned embodiment are merely illustrative, and can be changed variously based on design requirements without departing from the gist of the present invention.

For example, in the above-mentioned embodiment, although a configuration in which the plate member is fastened and fixed by the bolt has been described, the present invention is not limited to such a configuration, but may adopt, for example, a configuration in which the plate member is fastened and fixed by caulking at one end of the rotating shaft.

In addition, for example, in the above-mentioned embodiment, a configuration in which the first extending portion of the magnet is caused to extend based on the upper end face of a pan-type head of the bolt has been described. However, the present invention is not limited to such a configuration, and it is preferable that the criterion of the extension of the first extending portion of the magnet be based on the head portion, for example, in a case of a bolt having a head such as a round plate with no upper end face, a truss, or a bind type.

In addition, for example, in the above-mentioned embodiment, a configuration in which the rotation angle detection device according to the present invention is applied to a throttle valve has been described. However, the present invention is not limited to such a configuration, but can be applied to a rotating actuator such as, for example, a geared motor in general.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. A rotation angle detection device, having a magnet installed on a rotating shaft, which magnetically detects a rotation angle of the rotating shaft, the device comprising:
    a magnetizing body having a magnet installed onto the valve shaft, which rotates together therewith, and a magnetic sensor that magnetically detects the rotation angle of the valve shaft, the magnetic sensor having a magneto-electric conversion element mounted onto a substrate and being structured to detect a magnetic field of the magnet and output the detection signal to a control device;
    a plate member having a predetermined thickness which is fastened and fixed to one end of the rotating shaft,
    wherein the magnet is molded to the plate member into a cylindrical shape having a height larger than the predetermined thickness and is fixed to the rotating shaft via the plate member.

2. The rotation angle detection device according to claim 1, wherein the plate member includes an outer edge portion which is buried in an inner circumferential surface of the magnet.

3. The rotation angle detection device according to claim 1, wherein the magnet includes a first extending portion extending to one surface side of the plate member, and a second extending portion extending to the other surface side of the plate member.

4. The rotation angle detection device according to claim 3, wherein the plate member is fastened and fixed to the one end of the rotating shaft by a bolt inserted from the one surface side, and
    the first extending portion extends to at least a head portion of the bolt protruding to the one surface side of the plate member.

5. The rotation angle detection device according to claim 3, wherein the second extending portion extends so as to be larger than the first extending portion.

6. The rotation angle detection device according to claim 1, wherein the plate member is formed of a non-magnetic metal material.

* * * * *